US010875457B1

(12) United States Patent
Green

(10) Patent No.: US 10,875,457 B1
(45) Date of Patent: Dec. 29, 2020

(54) DRAG LINK STAND

(71) Applicant: LockNClimb, LLC, Independence, KS (US)

(72) Inventor: Jeffrey Alan Green, Independence, KS (US)

(73) Assignee: LOCK N CLIMB, LLC, Independence, KS (US)

( * ) Notice: Subject to any disclaimer, the term of this patent is extended or adjusted under 35 U.S.C. 154(b) by 0 days.

(21) Appl. No.: 16/534,480

(22) Filed: Aug. 7, 2019

(51) Int. Cl.
*B60R 3/00* (2006.01)

(52) U.S. Cl.
CPC .................................... *B60R 3/007* (2013.01)

(58) Field of Classification Search
CPC ....................................................... B60R 3/007
See application file for complete search history.

(56) References Cited

U.S. PATENT DOCUMENTS

| D263,131 S | * | 2/1982 | Mitchell | D12/203 |
| D298,321 S | * | 11/1988 | Watanabe | D14/138 AA |
| D313,388 S | * | 1/1991 | Dale | D12/203 |
| D536,651 S | * | 2/2007 | Polka | D12/203 |
| 7,219,910 B2 | * | 5/2007 | Dunford | B60R 3/00 |
| | | | | 182/127 |
| 7,828,118 B2 | * | 11/2010 | Barbara | E06O 5/02 |
| | | | | 182/127 |

* cited by examiner

*Primary Examiner* — John D Walters
*Assistant Examiner* — James J Triggs
(74) *Attorney, Agent, or Firm* — Katten Muchin; Rosenman LLP

(57) ABSTRACT

Disclosed herein is a drag link stand which releasably couples to a spring and drag link of a vehicle. A top surface of the drag link stand comprises a slip resistant surface to help prevent falls. The top surface also provides full foot support to reduce the chance of foot thrombosis. A spring flange extends from a rear of the top surface and engages the spring. A drag link flange extends downward from the top surface and engages the drag link. The drag link stand employs a unibody construction and has no moving parts which provides additional durability.

18 Claims, 9 Drawing Sheets

US 10,875,457 B1

DRAG LINK STAND

FIELD OF THE INVENTION

This application discloses a drag link stand for use during vehicle maintenance. More particularly, the present application discloses a stable drag link stand configured to fit between the spring and drag link of a vehicle while providing full foot support.

BACKGROUND

Large trucks, and in particular tractor-trailer trucks, require constant maintenance because they are typically used in long haul operations, such as shipping and delivery. As a result, the engines of tractor-trailer trucks must constantly be serviced. In most tractor-trailer trucks, the user simply stands on the tire to service the area in the vicinity of the steering system. However, the tire is a curved surface and awkward to stand on for the user. Standing on a surface, such as a tire, can lead to slippage or severe injury to the user Therefore, a need exists for an apparatus which provides a stable, non-slip surface which a user can access to perform vehicle maintenance. Further, the apparatus is preferably removable so that it can be used on a plurality of vehicles and can be stored when not in use. The present invention provides a solution to these aforementioned issues in the form of a drag link stand which will be described herein.

SUMMARY

Disclosed herein is a drag link stand which releasably couples to a spring and drag link of a vehicle. A top surface of the drag link stand comprises a slip resistant surface to help prevent falls. The top surface also provides full foot support to reduce the chance of foot thrombosis. A spring flange extends from a rear of the top surface and engages the spring. A drag link flange extends downward from the top surface and engages the drag link. The drag link stand employs a unibody construction and has no moving parts which provides additional durability and simplifies construction.

DESCRIPTION OF THE DRAWINGS

These and other advantages of the present invention will be readily understood with reference to the following specifications and attached drawings wherein.

DETAILED DESCRIPTION

Preferred embodiments of the present invention will be described herein below with references to the accompanying drawings. In the following description, well-known functions or constructions are not described in detail, since such minutia would obscure the invention in unnecessary trivia.

Figure 7:
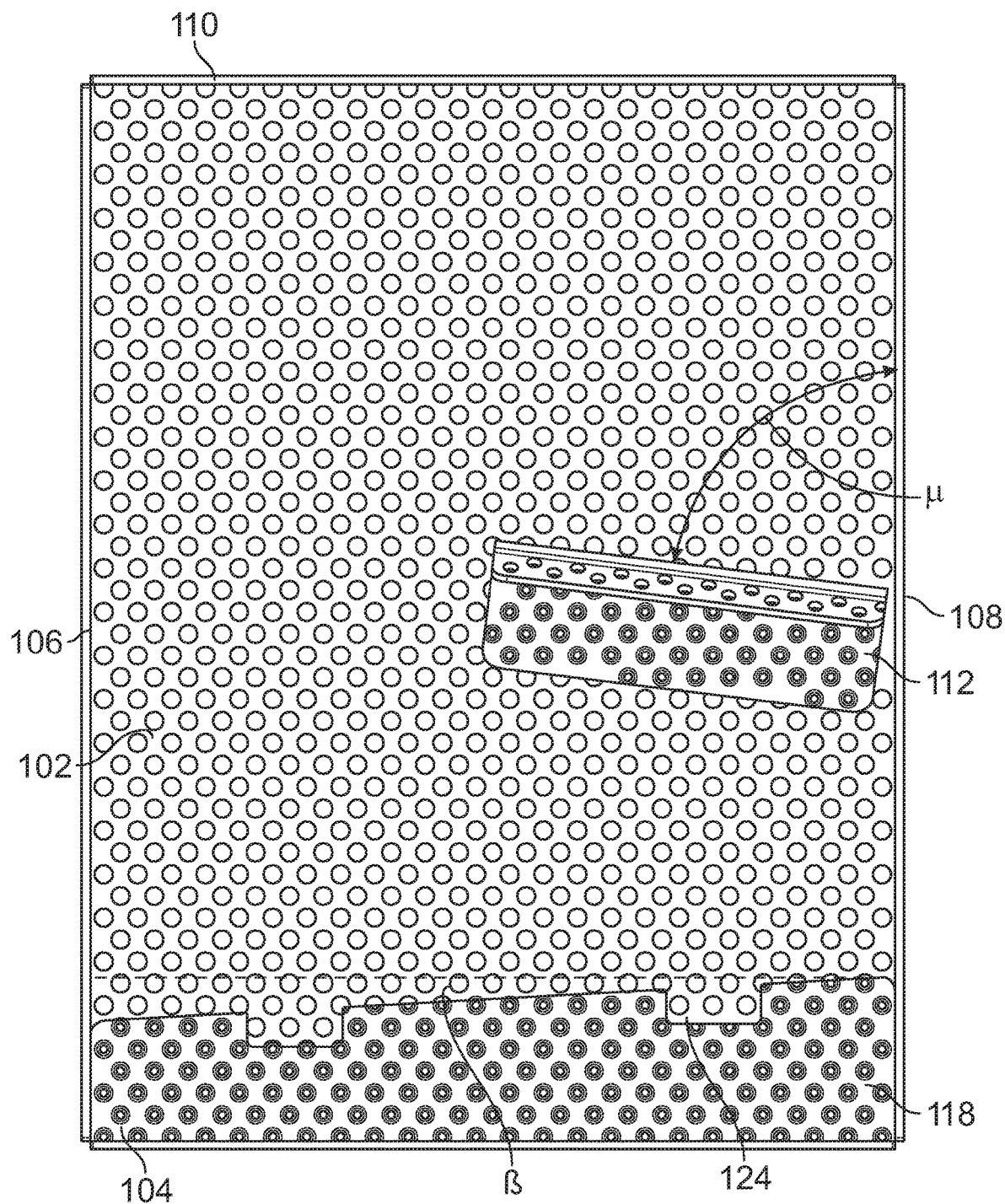
FIG. 7 is a bottom view of the drag link stand of the present invention.

Referring to FIGS. 1-7 concurrently, depicted is drag link stand 100. The main body of drag link stand 100 generally comprises top surface 102, spring flange 104, right sidewall 106, left sidewall 108 (FIG. 4), and rear sidewall 110. A second flange, drag link flange 112, is coupled to a bottom surface of top surface 102 as depicted in FIG. 7. All of the listed components of drag link stand 100 are preferably formed from steel or aluminum, preferably grade 6061 industrial aluminum. Further, all surface of drag link stand 100 preferably are covered with a treaded surface, such as 1/8 Traction Tread™ from Direct Metals Company, LLC.

Top surface 102, spring flange 104, right sidewall 106, left sidewall 108, and rear sidewall 110 are preferably all formed from a single flat piece of aluminum through pressing or cutting. The left sidewall 108, right sidewall 106, and rear sidewall 110 are then bent downward at 90° as depicted. Preferably, left sidewall 108, right sidewall 106, and rear sidewall 110 extend downward from top surface 102 (when bent) a total distance of 1.5"-2.5", but more preferably 2".

Figure 1:
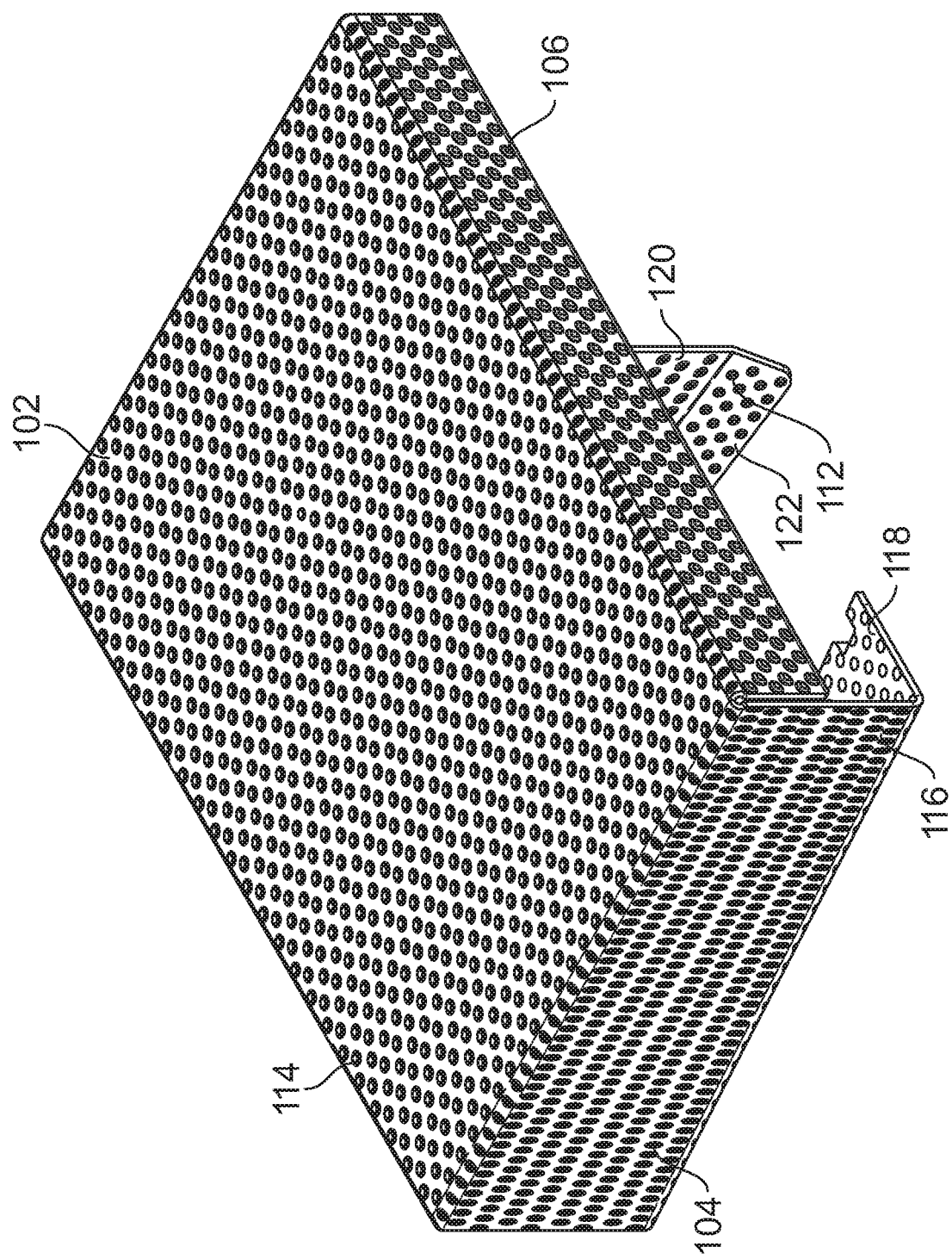
FIG. 1 is a front perspective view of a drag link stand of the present invention.

Similarly, spring flange 104 is bent downward 90° and formed into the shape depicted in FIG. 1. Right sidewall 106, left sidewall 108, and rear sidewall 110 all help to reinforce top surface 102 from warping or bending when a user stands on top surface 102 due to the resistance provided by the bends in the metal used to create those surfaces. Further, in some embodiments, the corners of the sidewalls 108, 106, and 110 and/or spring flange 104 are not connected to each other as depicted in the figures to reduce cost in construction (i.e., reduces needs for welds). However, it should be obvious that the corners of drag link stand 100 could be coupled together via welding or brackets if needed.

Drag link flange 112 is then formed from another piece of aluminum and coupled to the underside of top surface 102 as depicted in FIG. 7. Preferably, drag link flange 112 is coupled to top surface 102 through welding so there are no protrusions on top surface 102 which may cause a user to trip (i.e., create an uneven surface).

All of the surface of drag link stand 100 preferably comprise raised openings 114, arranged in a grid pattern, which provide a plurality of advantages. First, raised openings 114 on top surface 102 provide a slip resistant surface for a user to stand on. Further, raised openings 114 also reduce the weight of drag link stand 100. The raised openings 114 also provide less wind resistance and help to prevent drag link stand 100 accidentally becoming dislodged from a vehicle when in place. Also, if there is inclement weather or a user accidentally spills something during maintenance, raised openings 114 allow some of the liquid to pass through and prevents pooling on top surface 102 or anywhere else on drag link stand 100.

In some embodiments, top surface 102 may further be coated with a coating or a rubberized surface to increase the durability of drag link stand 100. Or, in other embodiments, a top surface of each raised opening 114 is filed or roughened to increase the grip provided to the user. Top surface 102 is preferably rectangular in shape, having a length of 15"-19", but more preferably 17". Top surface 102 preferably has a width of 12"-14", but more preferably 13".

Spring flange 104 comprises front sidewall 116 and engagement support 118 as depicted in FIG. 1. Unlike the other sidewalls, front sidewall 116 preferably tapers in thickness from left sidewall 108 to right sidewall 106.

Engagement support 118 is angled at 90° relative to front sidewall 116 in the direction of rear sidewall 110 that it is parallel to top surface 102.

Figure 2:
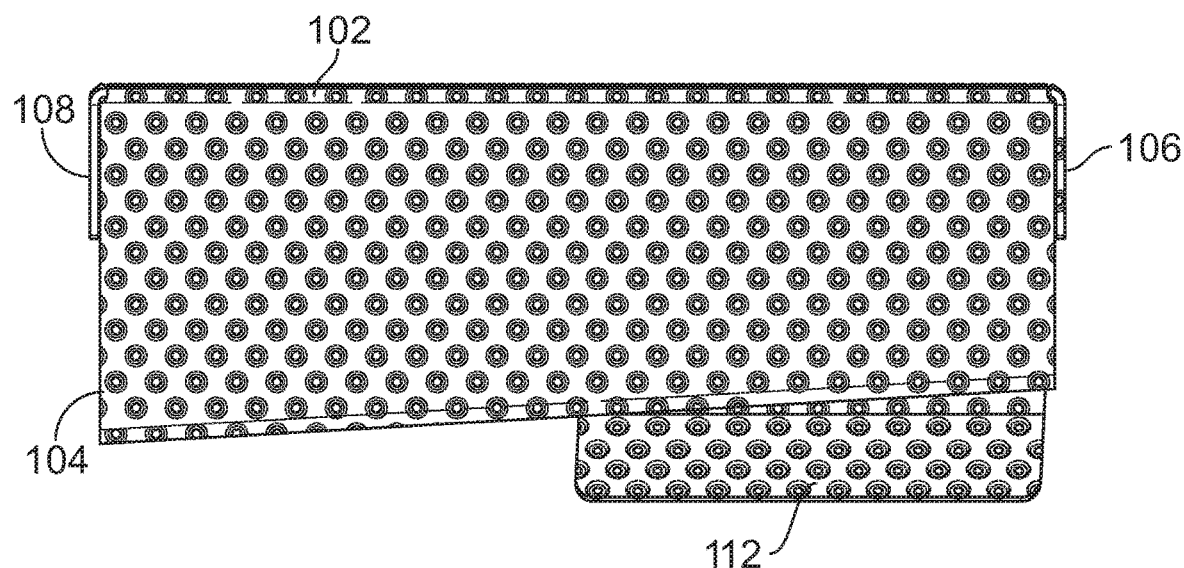
FIG. 2 is a front view of the drag link stand of the present invention.

Preferably, engagement support 118 tapers in width from right sidewall 106 to left sidewall 108 as depicted in FIG. 7. For example, engagement support 118 preferably extends downward from top surface 102 a distance of 4.5"-5", but more preferably 4.75" from right sidewall 106 whereas engagement support 118 preferably extends downward from top surface 102 a distance of 3.5"-4.5", but more preferably 4" at left sidewall 108. As best shown in FIG. 2, this causes engagement support to linearly decrease in height at angle ω which is ~3°-4° (more preferably 3.3°).

Engagement support 118 further preferably increases in height at an angle β which is ~3°-4° (more preferably 3.3°) from right sidewall 106 to left sidewall 108. Preferably, as depicted in FIG. 7, a first end of engagement support 118 extends 1.75"-2.25" parallel to right sidewall 106 while a second end of engagement support 118 extends 2.5"-3" parallel to left sidewall 108. The edge of engagement support 118 may also comprise one or more rectangular notches 124 along its length.

The geometry of both front sidewall 116 and engagement support 118 creates a channel with a tapered geometry which better engages the spring of the vehicle as will be explained later. Further, there is also a smaller channel created between right sidewall 106, left sidewall 108, front sidewall 116, and engagement support 118 which hooks onto the spring of the vehicle as will be shown later.

Drag link flange 112 comprises middle sidewall 120 and angled support 122. As best shown in FIG. 7, middle sidewall 120 is coupled to the underside of top surface 102 at an angle μ ~80-85° (more preferably 83°) with respect to left sidewall 108. Further, a first end of middle sidewall 120 is coupled to an underside of top surface 102 a distance of 7"-9", but more preferably 8", away from rear sidewall 110 along right sidewall 106. The portions of middle sidewall 120 and angled support 122 facing spring flange 104 preferably comprise raised openings 114 or other tread as depicted in FIG. 1.

Figure 4:
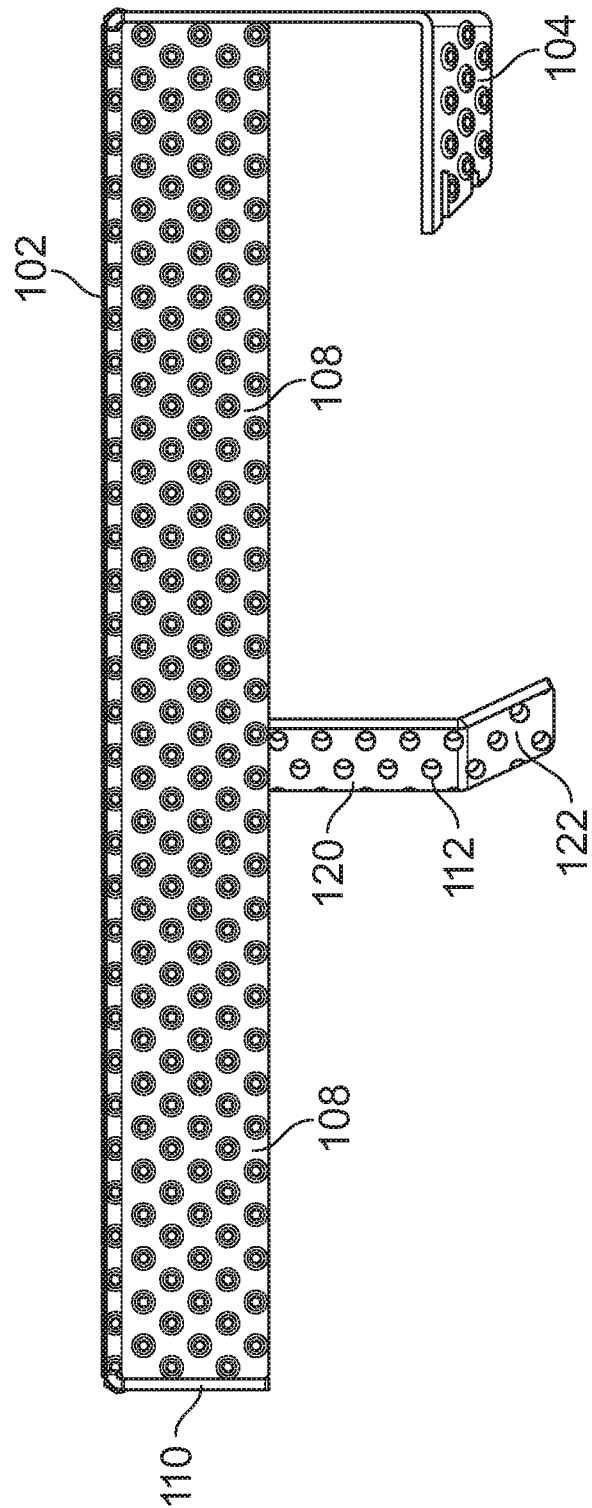
FIG. 4 is a left side view of the drag link stand of the present invention.
Figure 5:
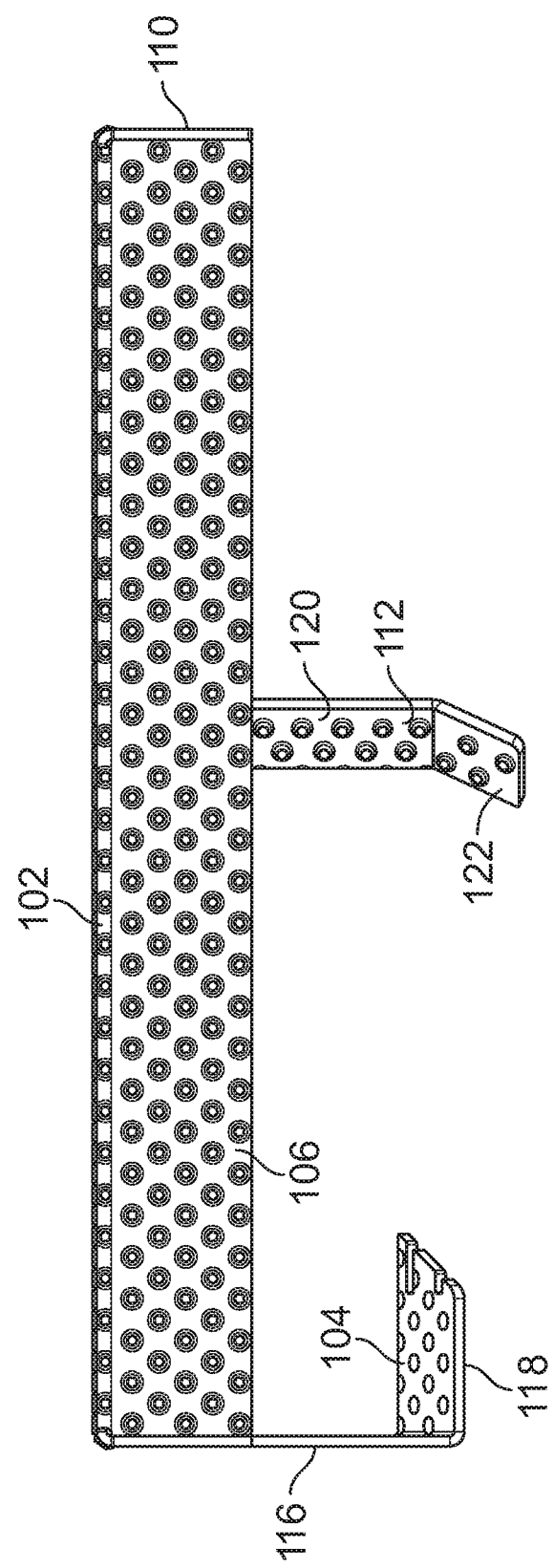
FIG. 5 is a right side view of the drag link stand of the present invention.
Figure 6:
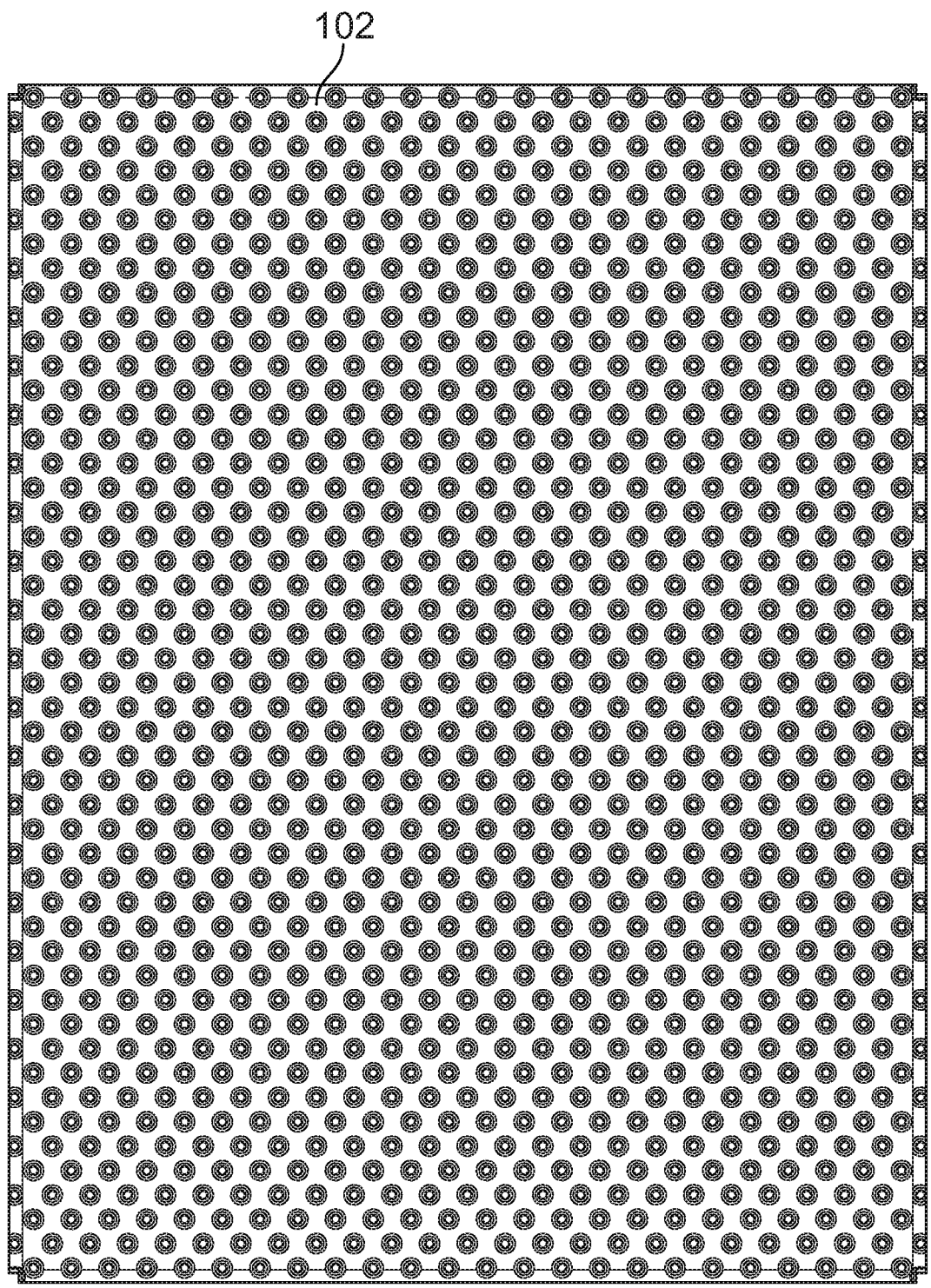
FIG. 6 is a top view of the drag link stand of the present invention.

This creates a channel that increases in width from left sidewall 108 to right sidewall 106 between drag link flange 112 and spring flange 104. This increase in width of the channel helps to accommodate the increase in separation that occurs between the spring and drag link of the vehicle where drag link stand 100 is secured. Further, as depicted in FIGS. 4 and 5, angled support 122 is angled downward and away from middle sidewall 120 toward front sidewall 116. This angle helps to engage the drag link of the vehicle.

Figure 3:
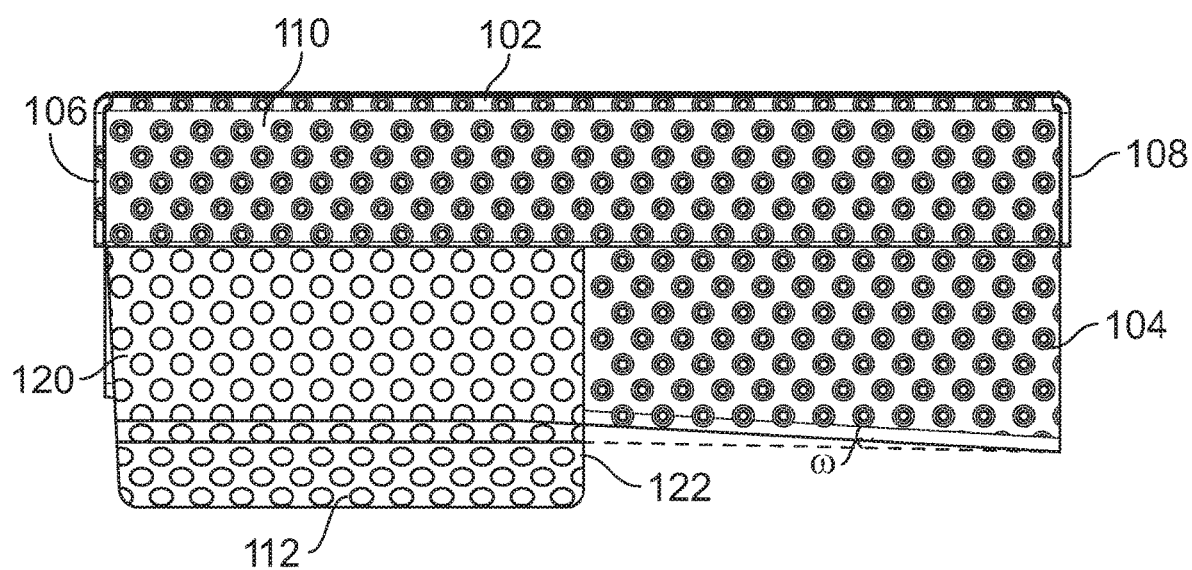
FIG. 3 is a rear view of the drag link stand of the present invention.

As shown in FIGS. 2 and 3, drag link flange 112 extends downward from top surface 102 further than spring flange 104. Specifically, drag link flange 112 extends downward from top surface 102 a total distance of 5"-6", but more preferably 5.5".

The construction of drag link stand 100 allow it to be constructed entirely by hand. Alternatively, the construction of drag link stand 100 can be automated using known methods. The slip resistant top surface 102 provides comfort and safety. Further, standing on the drag link stand 100 increases working comfort and decreases chance of foot thrombosis and accidents due to slips.

Top surface 102 provides a stable surface while performing engine maintenance. Further, drag link stand 100 disclosed herein exceeds OSHA (Occupational Safety and Health Administration) and ANSI (American National Standards Institute) specifications and is rated for 500 pounds. Due to the small footprint of drag link stand 100, it can easily be stored in the toolbox hatch of a standard trailer because it has lightweight, portable, and one-piece design with no moving parts to wear.

Figure 8:
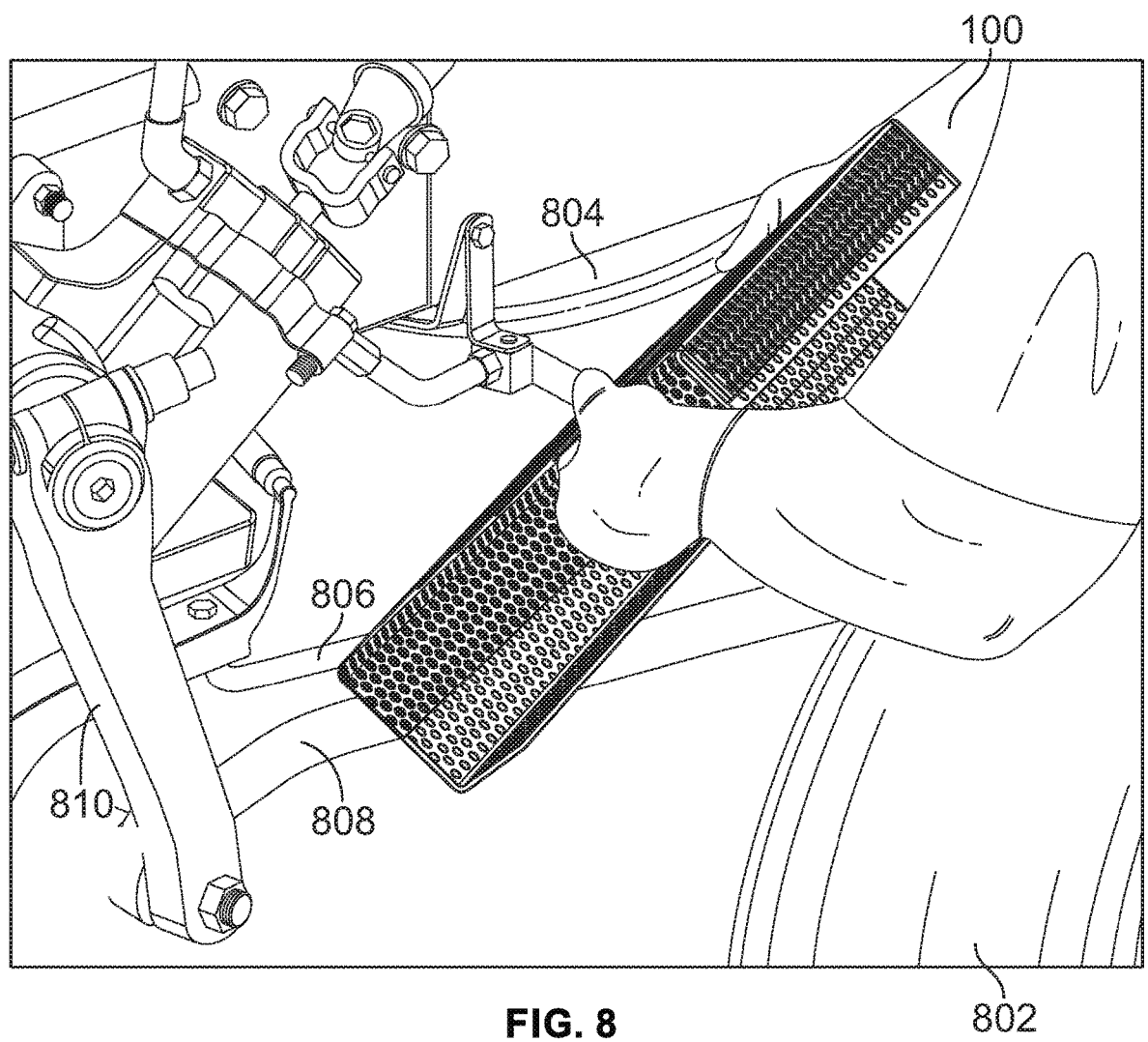
FIGS. 8-10 depict views of the drag link stand of the present invention being coupled to the spring and drag link of the vehicle.
Figure 9:
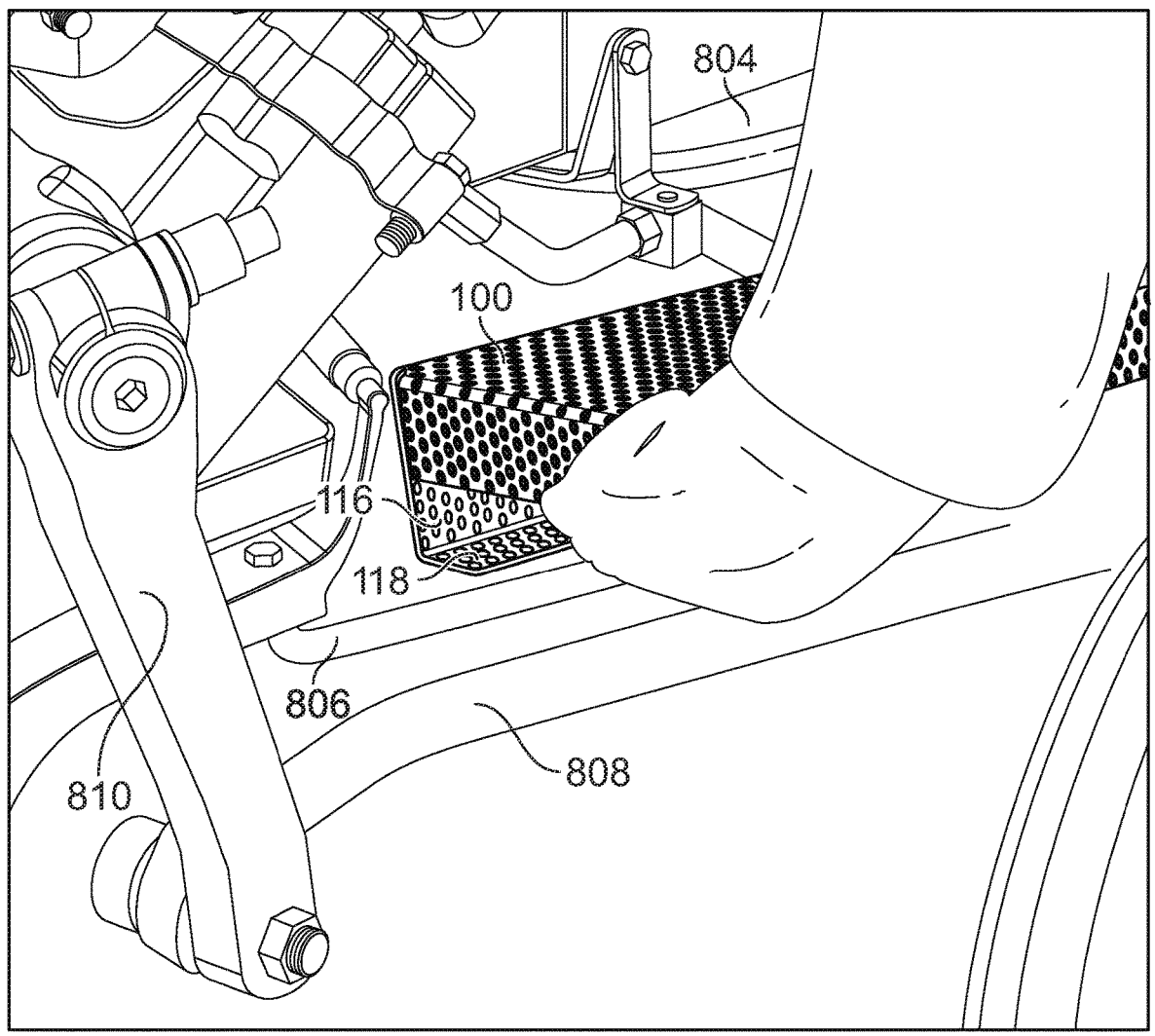
Figure 10:
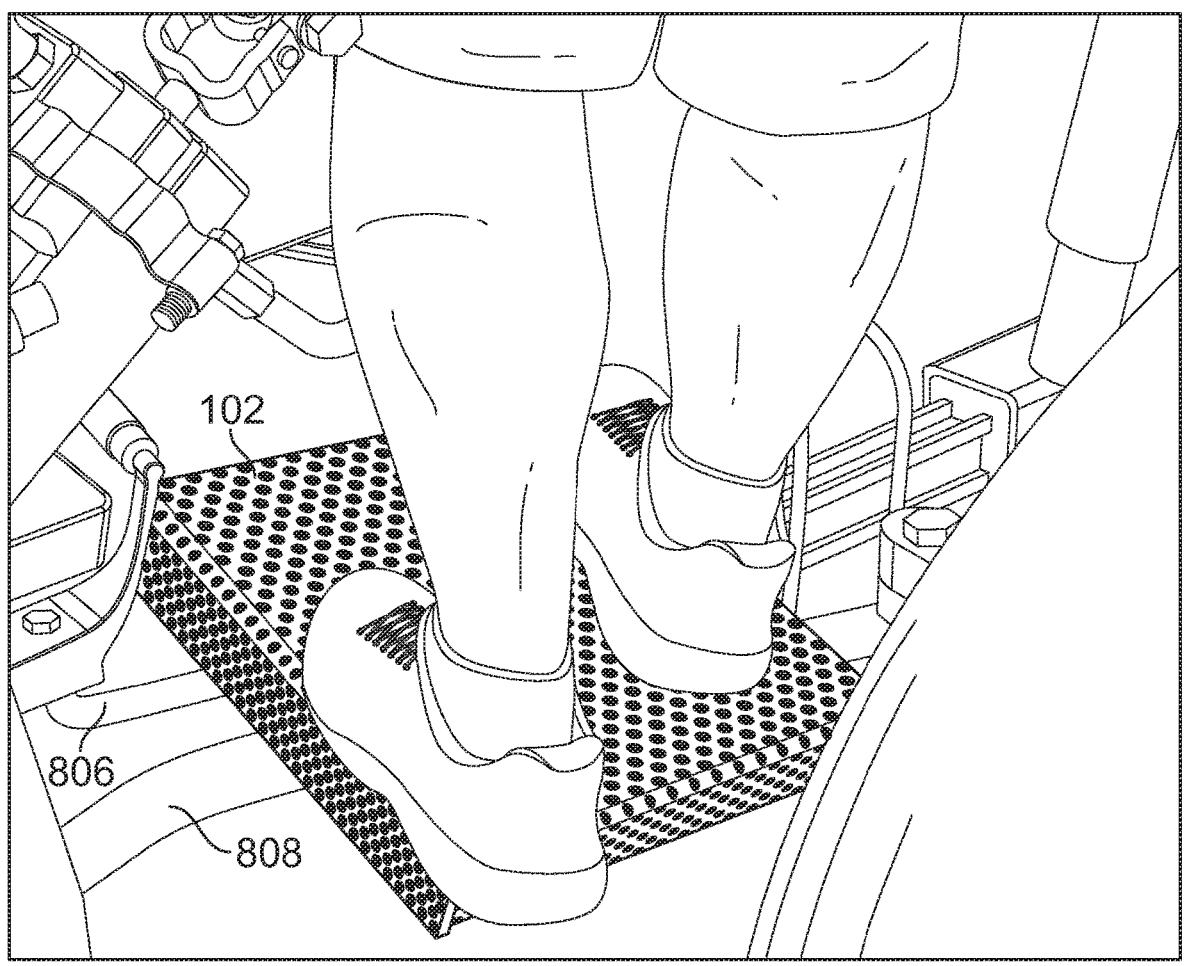

Typically, in order to perform maintenance of a vehicle in the vicinity of the drag link 808, the user would either awkwardly reach over the front tire or stand directly on the front tire. However, the front tire is curved and awkward to stand on and may become hot and/or slippery causing potential injury to the user. As depicted in FIGS. 8-10 the drag link stand 100 can provide easier and safer access to the vehicle while maintenance is being performed. In order to place drag link stand 100, a user first rotates tire 802 away from the vehicle chassis 804 as depicted in FIG. 8. This creates a gap between the vehicle chassis 804 and the tire 802, exposing the spring 806 and the drag link 808 located directly behind and coupled to pitman arm 810.

The user places the drag link stand 100 by angling the front sidewall 116 upward toward the user and hooking spring flange 104 over spring 806 such that a top surface of engagement support 118 engages a bottom surface of spring 806 as shown in FIG. 9. The drag link stand 100 can then be rotated downward using the connection between spring flange 104 and spring 806 as a pivot. As drag link stand 100 is rotated downward, a rear surface of middle sidewall 120 engages a front surface of drag link 808 while angled support 122 extends downward and slightly past drag link 808 (which is curved). Simultaneously, a bottom surface of right sidewall 106 and left sidewall 108 engages a top surface of both spring 806 and drag link 808 as depicted in FIG. 10. The drag link stand 100 at this point is completely level with respect to the vehicle while also being securely attached to the spring 806 and drag link 808 which prevents accidental movement or dislodgement via a snug fit. A user can then stand on top surface 102 to perform maintenance on the vehicle.

The unique geometry of drag link stand 100, which has been discussed herein, accommodates the unique geometry of both spring 806 and drag link 808 found in most commercial vehicle, such as tractor trailers. For example, the tapering of front sidewall 116 accommodates the angle of spring 806, allowing the top surface 102 of drag link stand 100 to remain level when placed. Also, the angled placement of drag link flange 112 accommodates the divergence between the spring 806 and drag link 808.

While the present invention has been described with respect to what are currently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation, so as to encompass all such modifications and equivalent structures and functions.

All U.S. and foreign patent documents, all articles, all brochures and all other published documents discussed above are hereby incorporated by reference into the Detailed Description of the Preferred Embodiment.

The invention claimed is:

1. A stand for performing vehicle maintenance, the stand comprising:
   a top surface having a rectangular shape;
   a rear sidewall extending downward from a rear edge of the top surface at a 90° angle;
   a left sidewall extending downward from a left edge of the top surface at a 90° angle;

a right sidewall extending downward from a right edge of the top surface at a 90° angle;
a front sidewall extending downward from a front edge of the top surface at a 90° angle;
an engagement member coupled to a bottom edge of the front sidewall at a 90° angle toward a direction of the rear sidewall; and
a drag link flange perpendicularly coupled to an underside of the top surface a predetermined distance from the rear surface adjacent an inner surface of the rear sidewall at an 80°-85° angle with respect to the right sidewall,
wherein the drag link flange further comprises:
a middle sidewall; and
an engagement support coupled to the middle sidewall, wherein the engagement support is angled 10°-50° toward the front sidewall.

2. The stand according to claim 1, wherein the front sidewall linearly decreases in thickness from the left sidewall to the right sidewall at an angle of 3°-3.5°.

3. The stand according to claim 1, wherein the front sidewall linearly decreases in thickness from the left sidewall to the right sidewall at an angle of 3.3°.

4. The stand according to claim 1, wherein the engagement member linearly decreases in thickness from the left sidewall to the right sidewall at an angle of 3°-3.5°.

5. The stand according to claim 1, wherein an entirety of the stand is formed from aluminum having a plurality of raised protrusions formed in a grid pattern.

6. The stand according to claim 1, wherein the spring flange does not extend an entire width of the stand.

7. The stand according to claim 1, wherein the top surface, the left sidewall, the right sidewall, the rear sidewall, the front sidewall, and the engagement member are formed from a unitary material.

8. The stand according to claim 1, wherein the spring flange is welded to the underside of the top surface.

9. The stand according to claim 1, wherein the front sidewall extends further downward from the top surface than the rear sidewall.

10. The stand according to claim 9, wherein the spring flange extends further downward from the top surface than the front sidewall and engagement member.

11. The stand according to claim 1, wherein the predetermined distance is less than half a length of the stand but more than half a width of the stand.

12. The stand according to claim 1, wherein the front sidewall and engagement member form a rear facing channel configured to engage a spring of a tractor-trailer during the vehicle maintenance.

13. The stand according to claim 12, wherein the top surface is 12"-14" in length and 15"-17" in width.

14. The stand according to claim 1, wherein a width of the left sidewall, a width of the left sidewall, and a width of the right sidewall are a same width.

15. The stand according to claim 14, wherein a width of an entirety of the front sidewall is greater than the same width.

16. The stand according to claim 1, wherein the predetermined distance is 8".

17. A stand for performing vehicle maintenance, the stand comprising:
a top surface having a rectangular shape;
a rear sidewall extending downward from a rear edge of the top surface at a 90° angle;
a left sidewall extending downward from a left edge of the top surface at a 90° angle;
a right sidewall extending downward from a right edge of the top surface at a 90° angle;
a front sidewall extending downward from a front edge of the top surface at a 90° angle;
an engagement member coupled to a bottom edge of the front sidewall at a 90° angle toward a direction of the rear sidewall; and
a drag link flange perpendicularly coupled to an underside of the top surface a predetermined distance from the rear surface adjacent an inner surface of the rear sidewall at an 80°-85° angle with respect to the right sidewall,
wherein the front sidewall linearly decreases in thickness from the left sidewall to the right sidewall at an angle of 3°-3.5°.

18. A stand for performing vehicle maintenance, the stand comprising:
a top surface having a rectangular shape;
a rear sidewall extending downward from a rear edge of the top surface at a 90° angle;
a left sidewall extending downward from a left edge of the top surface at a 90° angle;
a right sidewall extending downward from a right edge of the top surface at a 90° angle;
a front sidewall extending downward from a front edge of the top surface at a 90° angle;
an engagement member coupled to a bottom edge of the front sidewall at a 90° angle toward a direction of the rear sidewall; and
a drag link flange perpendicularly coupled to an underside of the top surface a predetermined distance from the rear surface adjacent an inner surface of the rear sidewall at an 80°-85° angle with respect to the right sidewall,
wherein the engagement member linearly decreases in thickness from the left sidewall to the right sidewall at an angle of 3°-3.5.

* * * * *